United States Patent
Chuberre et al.

(10) Patent No.: US 8,615,271 B2
(45) Date of Patent: Dec. 24, 2013

(54) RADIO COMMUNICATION TERMINAL BROADCASTING ET RECEPTION METHOD AND BROADCASTING SYSTEM

(75) Inventors: Nicolas Chuberre, Pibrac (FR); Thibault Gallet, Launac (FR); Christophe Nussli, Toulouse (FR); Beatrice Martin, Paris (FR); Michel-Guy Francon, Toulouse (FR); Brigitte Romann, Rueil-Malmaison (FR); Dominique Deprey, Courbevoic (FR)

(73) Assignee: Alcatel Lucent, Paris (FR)

( * ) Notice: Subject to any disclaimer, the term of this patent is extended or adjusted under 35 U.S.C. 154(b) by 162 days.

(21) Appl. No.: 10/504,917

(22) PCT Filed: Dec. 5, 2002

(86) PCT No.: PCT/FR02/04187
§ 371 (c)(1),
(2), (4) Date: Aug. 18, 2004

(87) PCT Pub. No.: WO03/071697
PCT Pub. Date: Aug. 28, 2003

(65) Prior Publication Data
US 2005/0085182 A1    Apr. 21, 2005

(30) Foreign Application Priority Data
Feb. 19, 2002   (FR) ................... 02 02091

(51) Int. Cl.
*H04M 1/00*    (2006.01)
(52) U.S. Cl.
USPC .................................... 455/553.1

(58) Field of Classification Search
USPC ................... 455/567, 512, 127.4
See application file for complete search history.

(56) References Cited

U.S. PATENT DOCUMENTS

| 5,724,659 | A | | 3/1998 | Basuthakur | |
|---|---|---|---|---|---|
| 5,794,157 | A | * | 8/1998 | Haartsen | 455/522 |
| 5,806,007 | A | * | 9/1998 | Raith et al. | 455/574 |
| 5,854,980 | A | * | 12/1998 | Takahashi et al. | 455/434 |
| 5,864,579 | A | * | 1/1999 | Briskman | 375/130 |
| 5,890,071 | A | | 3/1999 | Shimanuki | |
| 5,914,942 | A | | 6/1999 | Rydbeck | |
| 6,014,548 | A | | 1/2000 | Wang | |
| 6,334,062 | B1 | | 12/2001 | Chasman | |
| 6,658,455 | B1 | * | 12/2003 | Weinman, Jr. | 709/203 |
| 7,047,300 | B1 | * | 5/2006 | Oehrke et al. | 709/226 |
| 7,054,638 | B2 | * | 5/2006 | Rune et al. | 455/450 |
| 2002/0094847 | A1 | * | 7/2002 | Han | 455/567 |

(Continued)

FOREIGN PATENT DOCUMENTS

EP         0 601 820 A1    6/1994
WO      WO 01/89102 A1    11/2001

*Primary Examiner* — Temica M Beamer
*Assistant Examiner* — Joel Ajayi
(74) *Attorney, Agent, or Firm* — Sughrue Mion, PLLC (57) ABSTRACT

The invention concerns a radio communication terminal, comprising first means for transmitting/receiving RF signals to communicate in a cellular radio communication network, said first means being in standby mode when no communication is set up in the cellular network with another terminal or with the network itself. The invention is characterized in that the terminal comprises second means for receiving at least one carrier dedicated to collective data of multimedia contents, said second means being activated only when the first means are n standby mode. The invention also concerns a method for broadcasting and receiving collective data, as well as a system for broadcasting multimedia contents.

16 Claims, 3 Drawing Sheets

(56) References Cited

U.S. PATENT DOCUMENTS

| | | | |
|---|---|---|---|
| 2002/0128035 A1* | 9/2002 | Jokinen et al. | 455/552 |
| 2002/0128037 A1* | 9/2002 | Schmidt | 455/553 |
| 2002/0154759 A1* | 10/2002 | Ishii | 379/373.01 |
| 2002/0177465 A1* | 11/2002 | Robinett | 455/552 |
| 2002/0178271 A1* | 11/2002 | Graham et al. | 709/229 |
| 2004/0018834 A1* | 1/2004 | Talaie et al. | 455/422.1 |

* cited by examiner

FIG_3

RADIO COMMUNICATION TERMINAL BROADCASTING ET RECEPTION METHOD AND BROADCASTING SYSTEM

The present invention relates to a mobile radio terminal, a system for broadcasting multimedia contents, an associated broadcasting method, and a method of receiving collective information of multimedia contents for use in this kind of mobile radio terminal. The terminal is connected to the system for broadcasting multimedia contents to broadcast collective information over dedicated radio resources. The system is based on a network of terrestrial transmitters, geostationary or non-geostationary broadcasting satellites or on a combination of broadcasting satellites and terrestrial repeaters.

In the context of the present description, the expression "collective multimedia information" refers to information of any type (video, radio, text, animation, downloadable software, etc.) of interest to some or all users of a radio communication system.

There exist today various standards known in the art governing mobile telephone systems and architectures. They include in particular the Global System for Mobile telecommunications (GSM) standard and the more recent Universal Mobile Telecommunication System (UMTS) standard governing third generation (3G) high bit rate mobile transmission. The expression "GSM network" also refers to the GPRS and GERAN services and enhancements known in the art.

In the order in which they are referred to above, these standards provide the benefits of ever increasing transmission bit rates for transporting voice/data for point-to-point connections (i.e. for communication between two users).

However, until now, there have been few solutions for broadcasting collective information and the above standards are ill suited to this application.

This type of broadcasting is called "broadcasting" in the case of indiscriminate broadcasting to the whole of a population of users of a cellular mobile radio network, but if the addressees of the information constitute a subset of that population it is known as "multicasting". In the latter case, the subset may be defined by a corresponding subscription, for example.

The present invention therefore aims to enable broadcasting or multicasting to a mobile radio terminal connected to a cellular mobile radio network in order for the user to be able to receive collective information from the broadcasting system whilst retaining the ability to receive calls via the mobile telephone network. For example, the collective information may comprise advertisements, radio or television programs, or software of specific interest to users of the broadcast cell, such as software for operating the terminals or training programs. As a general rule, this corresponds to any multimedia content (voice and/or video and/or data) intended to reach an audience.

To this end, the invention consists in a mobile radio terminal comprising first means for transmitting/receiving radio frequency signals adapted to transmit/receive on paired data/voice carriers to communicate in a cellular mobile radio network, said first means being in a standby mode when no call is set up via the cellular network with another terminal or with the network itself, characterized in that it comprises second means for receiving at least one downlink carrier dedicated to the broadcasting of multimedia content collective information, said second means being activated only when the first means are in the standby mode.

It will be noted that, thanks to the invention, the user's calls are not impeded by the reception and/or transmission of collective information on the carrier. Solving the problem of the coexistence of the cellular network call carrier and the collective information broadcasting carrier using a particular broadcasting mode conforming to the invention avoids the need to provide a dedicated device for managing interruptions in the collective information transmission station. Thus the present invention allows conversion and optimization of existing infrastructures. Also, it requires modification of only the terminal as it simply requires an add-on (generally a software add-on) for managing the switching means (see below) and the interruptions of the second receive means.

The invention is of particular benefit in hardware terms as it optimizes the use of the terminals without increasing their unit cost and without significantly modifying the remainder of the telecommunication system. Multimode terminals compatible with the GSM and UMTS standards will require only slight hardware modifications to yield a terminal of the invention.

In one embodiment the second means for receiving radio frequency signals are adapted to receive a W-CDMA UTRA FDD downlink carrier that is not necessarily paired to a W-CDMA UTRA FDD uplink carrier.

In one embodiment the second receiving means are coupled to second transmission means adapted to transmit/receive alternately at least one paired uplink and downlink W-CDMA UTRA FDD carrier, said second transmit/receive means having the role of said first transmit/receive means, which is that of transmitting/receiving data/voice.

In one embodiment the parameters, including the clocks, the PDCP/BMC, RRC, RLC, MAC and PHY layers used by the cellular voice communication network and the system for broadcasting multimedia contents are divided in a memory system of the terminal, thus providing the clocks and the configurations associated with each of the carriers of said cellular network and the system for broadcasting multimedia contents to the terminal.

In one embodiment the terminal comprises switching means for activating second means for receiving the multimedia content information carrier after the first transmit/receive means are placed on standby.

In one embodiment priority is assigned to calls in the cellular network and the switching means are adapted to switch the first transmit/receive means to an active state when a call arises in said network.

In one embodiment control means of the terminal are adapted to control at regular time intervals the content of messages transmitted by said cellular network and said switching means are adapted to activate the first transmit/receive means and the second transmit/receive means, respectively, as a function of instructions from the control means.

In one embodiment the terminal comprises storage means for storing the stream of collective information of received multimedia contents.

In one embodiment at least some of the circuitry of the first transmit/receive means is common to a portion of the circuitry of the second receive means.

In one embodiment the first transmit/receive means are adapted to operate in frequency bands reserved for the GSM and/or UMTS system and the second receive means are adapted to operate in frequency bands reserved for IMT 2000 high bit rate transmissions.

In one embodiment the carrier dedicated to multimedia content collective information is transmitted by a satellite of a collective information transmission system comprising at least one satellite segment and terrestrial repeaters and in that the frequency bands used are preferably the IMT 2000 bands reserved for satellite mobile systems.

In one embodiment the carrier dedicated to collective information is transmitted by a terrestrial repeater of a collective information broadcasting system and in that the frequency bands used are the IMT 2000 bands.

The invention also provides a method of broadcasting multimedia content collective information by a collective information transmission system, comprising a step of wide broadcasting transmission to a plurality of terminals according to the invention, characterized in that said method reiterates the transmission of the collective information in data packets with coding redundancy enabling the required monitoring by the terminal of messages on the cellular network.

The invention further provides a method of receiving collective information by a mobile radio terminal comprising first radio frequency signal transmit/receive means for communicating in a cellular mobile radio network, said first means being in a standby mode when no call is set up via the cellular network with another terminal or with the network itself, characterized in that said method comprises:
a step of detecting the standby mode of the first transmit/receive means, and
a step of activating reception of a carrier dedicated to multimedia content collective information when the standby mode is detected.

The invention further provides a system for broadcasting multimedia content to at least one terminal, characterized in that it comprises:
a service center for grouping and multiplexing multimedia contents received from a plurality of sources,
a multimedia content concentrator adapted to receive information transmitted by said service center and comprising transmit means for transmitting a multimedia content carrier, and
a retransmission satellite adapted to receive the latter carrier to convert it to a second carrier in the direction of at least one terrestrial repeater,
said terrestrial repeater comprising means for receiving said second multimedia content carrier and means (34) for extracting said multimedia content information from said second carrier to forward it on a third carrier adapted to be received by the terminal.

In one embodiment of the system the concentrator comprises second means for transmitting said multimedia content information on a fourth carrier to the satellite which is adapted to convert from the fourth carrier to the third carrier that the terminal is adapted to receive directly.

In one embodiment of the system the CDMA signals modulated onto the third carrier transmitted by the satellite and by the terrestrial repeaters are received by the terminal in a time window enabling their coherent combination.

To facilitate an understanding of the invention, nonlimiting embodiments of the invention are described next with the aid of the appended drawings, in which.

1. Terminal Receiving/Transmitting a GSM (or UMTS) Voice Carrier and Receiving an S-UMTS Multimedia Content Carrier In a first embodiment of the invention shown in FIG. 1, dual mode GSM/UMTS terminals obtain the benefit of the collective broadcasting service without major impact on their architecture (remember that references to the GSM include the GPRS).

It is assumed that the 3G terminals (i.e. terminals conforming to the UMTS standard) in most widespread use are mostly multimode terminals conforming to the technical specification of the "Terminal Group" produced within the context of the "Third Generation Partnership Project" (Technical Specification Group Terminals; Multi-mode UE issues: Categories, principles and procedures), reference 3G TR 21.910 V3.0.0, published in July 2000. These multimode terminals must be able to operate either in a GSM/GPRS network or in a GSM/UMTS network and will be the terminals in most widespread use throughout the UMTS network roll-out phase in particular. They will enable the user to retain access to the telephone services of GSM networks outside UMTS regions. It will be noted that the coverage of GSM networks, at the filing date of this application, is substantially 85% of Europe, but will expand in future years as the result of government directives.

The provisions of the invention enabling these terminals to receive multimedia collective information via the broadcasting system whilst retaining the possibility of receiving calls are described hereinafter.

The broadcasting system transmits W-CDMA carriers based on the UTRA FDD air interface defined by the 3GPP. Furthermore, it implements in the transport layer protection techniques applied to the contents transmitted (at file level) enabling major and numerous transmission interruptions to be tolerated. These techniques are based on FEC preventive error coding, interleaving techniques or carousel type transmission repetition.

The terminal may be configured for registration on the GSM network or the UMTS network. Once registered with one of the two networks, the terminal is "attached" to the network. In the present embodiment, it is assumed that the terminal operates on a GSM network voice carrier, thus using its GSM data processing capabilities for voice calls, as explained hereinafter. In another mode of operation that is not described but obviously constitutes a portion of the scope of the invention, the terminal of the invention communicates on a UMTS network voice carrier using its UMTS network data processing capabilities for voice calls. In addition to these two exclusive voice communication modes (GSM voice carrier or UMTS voice carrier), the data of multimedia contents is conveyed on a UMTS broadcast carrier and the terminal uses its UMTS processing capabilities to recover the data.

When the terminal is not communicating but is monitoring the network it is in the "idle" mode, in which the terminal remains synchronized to the network and must "listen" at regular times for paging messages transmitted on the CCCH informing it of a possible incoming call. It must also measure signals received from base transceiver stations (BTS) to decide whether handover to a new base transceiver station that it would receive better is appropriate. The remainder of the time the terminal is on standby to save power.

Figure 1:
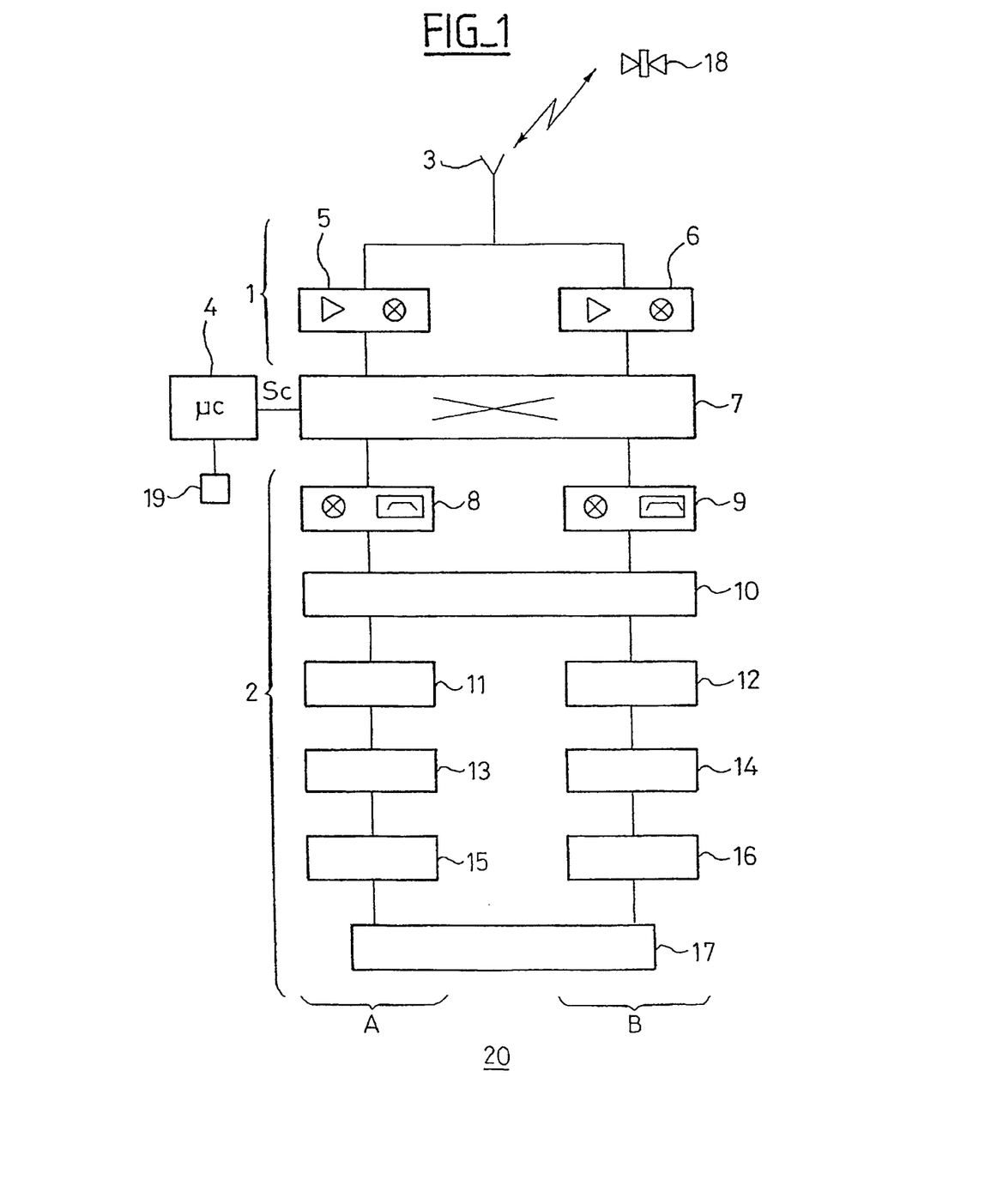
FIG. 1 is a diagrammatic representation of one embodiment of a terminal of the invention.

As shown in FIG. 1, the terminal 20 of the invention comprises a first radio frequency signal transmit/receive system A adapted to transmit/receive GSM network data/voice and a second radio frequency signal transmit/receive system B adapted to transmit/receive UMTS network data. The two systems are connected to the same transmit/receive antenna 3. Each system comprises a respective receive/transmit part 1 and a respective signal processing part 2.

The antenna 3 is connected to an electronic device 5, 6 providing low-noise amplification and frequency transposition of the radio signal received by the antenna function.

A switching matrix 7 common to the two systems connects the receive parts 1 to the signal processing parts 2 and authorizes the connection of the signal processing parts of the system B to the receive part 6 provided that the system A is not activated to allow a call or for monitoring GSM/GPRS cellular network messages. This is verified by a microcontroller 4.

Each signal processing part 2 comprises a series of conventional devices that will not be described in detail here, namely a wideband filter 8, 9, a common carrier acquisition unit 10, a tracking unit 11, 12, a demodulator 13, 14, and a decoder 15, 16.

The two systems share the same compensation buffer memory 17, which has an exceptionally high storage capacity to deal with interruption of the collective information carrier. Thus if a stream of collective information is interrupted by a call on the GSM/GPRS network, for example, the information already received is buffered in the memory 17 until the missing information is received.

The embodiment of the terminal shown in FIG. 1 operates in the following manner:

As mentioned hereinabove, the terminal 20 is at least a type 2 dual mode terminal as specified in the document 3G TR 21.910 v3.0.0. In one mode, the terminal receives/transmits in the GSM/GPRS bands. In the other mode, in accordance with the invention, the terminal alternately receives/transmits on paired uplink and downlink W-CDMA UTRA FDD carriers of the UMTS network and receives on a downlink W-CDMA UTRA FDD carrier that is not necessarily paired with an uplink carrier and is dedicated to broadcasting collective information of multimedia contents, for example. This type of dual mode terminal has the control and tracking capabilities of a second mode when it is operating in a first mode. According to the above standard, it is advantageous to use the UMTS bands for receiving/transmitting the collective information carrier. If the carrier is transmitted by a satellite, the S-UMTS bands are used, whereas if the carrier is transmitted by a terrestrial transmitter of a terrestrial transmission system, the T-UMTS bands are used.

In its nominal mode, the terminal is receiving paging messages, evaluating signals from the BTS of adjoining cells to evaluate the benefit of handover ("location update" or "routing area update"), and continuing the process of synchronizing with the network.

Because of this, the constraints associated with the dual mode operation of the terminal stem from the necessity for the terminal when in standby on the network to "awake" to track GSM paging messages transmitted on the CCCH. The frequency at which the terminal must wake up to listen for paging messages on the network is defined in the GSM base station paging allocation multiframe parameter BS-PA-MFRMS. This parameter may be set to a value from 2 to 9 and corresponds to the number of multiframes 51 after which the terminal must listen for paging messages. Given that the duration of a multiframe 51 is 240 ms and that the minimum number of multiframes after which the terminal must listen for paging messages is 2, the minimum time between two awakenings of the terminal on the GSM network is 480 ms. Of course, in reality, this average time will be slightly less because of the durations of the processes for awakening the terminal and returning it to standby. Simultaneous reception conflicts are discussed hereinafter.

It is during this average time that the terminal is switched via the matrix 7 that has received an instruction from the microcontroller 4 by means of a control signal Sc to operate in the mode for receiving/transmitting the collective information carrier. However, as soon as an incoming/outgoing call or a paging message type request from the network appears, priority is always given to the GSM mode over the collective information receiving/transmitting mode.

Thus it is clear that the invention exploits the GSM network standby time periods of the terminal to receive collective multimedia information transmitted on one of the dedicated W-CDMA carriers of the broadcasting system.

The protection techniques implemented in the transport layer of the broadcasting system are designed to enable the terminal to reconstitute the transmitted collective information despite frequent interruption of reception.

The mechanism for managing interruptions associated with "going to sleep" and "waking up" periods associated with listening for paging messages and monitoring signals from adjacent base transceiver stations is used to command switching of the terminal to the mode for receiving a W-CDMA carrier from the collective information broadcasting system and conversely to the GSM operating mode to listen for paging messages, maintain synchronization and monitor signals from adjacent base transceiver stations.

The transport mechanisms of the broadcasting system may be extended to remedy interruptions longer than those created by activating point-to-point sessions via the GSM network to effect BTS relocation, and even to recover keys for decoding the broadcast content if access thereto is exclusive to users of the service. Furthermore, this session may convey any useful information for implementing a service exploiting broadcast or multicast mode use of the broadcasting system.

These transport mechanisms are based on coding and interleaving methods applied at the level of the stream of collective information. These methods create redundancy in the broadcast collective information stream. According to the invention, the interleaving depth and the coding levels are adjusted as a function of the interruptions necessary for listening for paging messages. Redundancy also enables the terminal to reproduce the broadcast collective information. Furthermore, broadcast protection may be strengthened by using strategies of retransmission at longer intervals in accordance with a process that is generally referred to by the term "carousel".

There will be explained hereinafter one example of a coding technique according to the invention for correcting transmission errors in the event of simultaneous reception on both carriers.

2. Prerequisites for Correct Operation of the Terminal of the Invention

In addition to what has been described hereinabove, the terminal of the invention must have clocks corresponding to the various carriers.

To this end, the protocols necessary for managing radio resources in the Nodes B in particular are summarized hereinafter.

Figure 2:
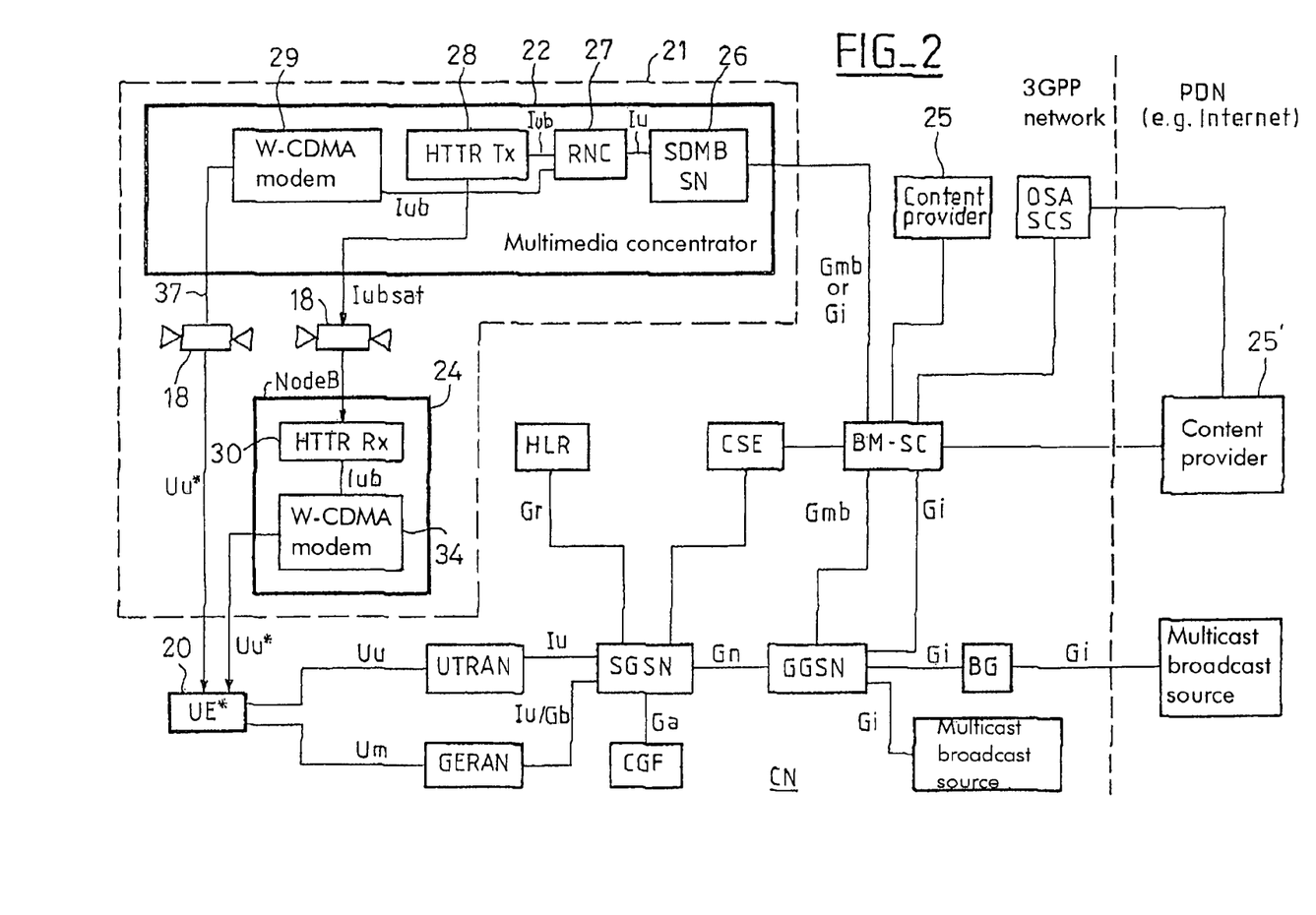
FIG. 2 represents a cellular network coupled to one embodiment of a broadcasting system.
Figure 3:
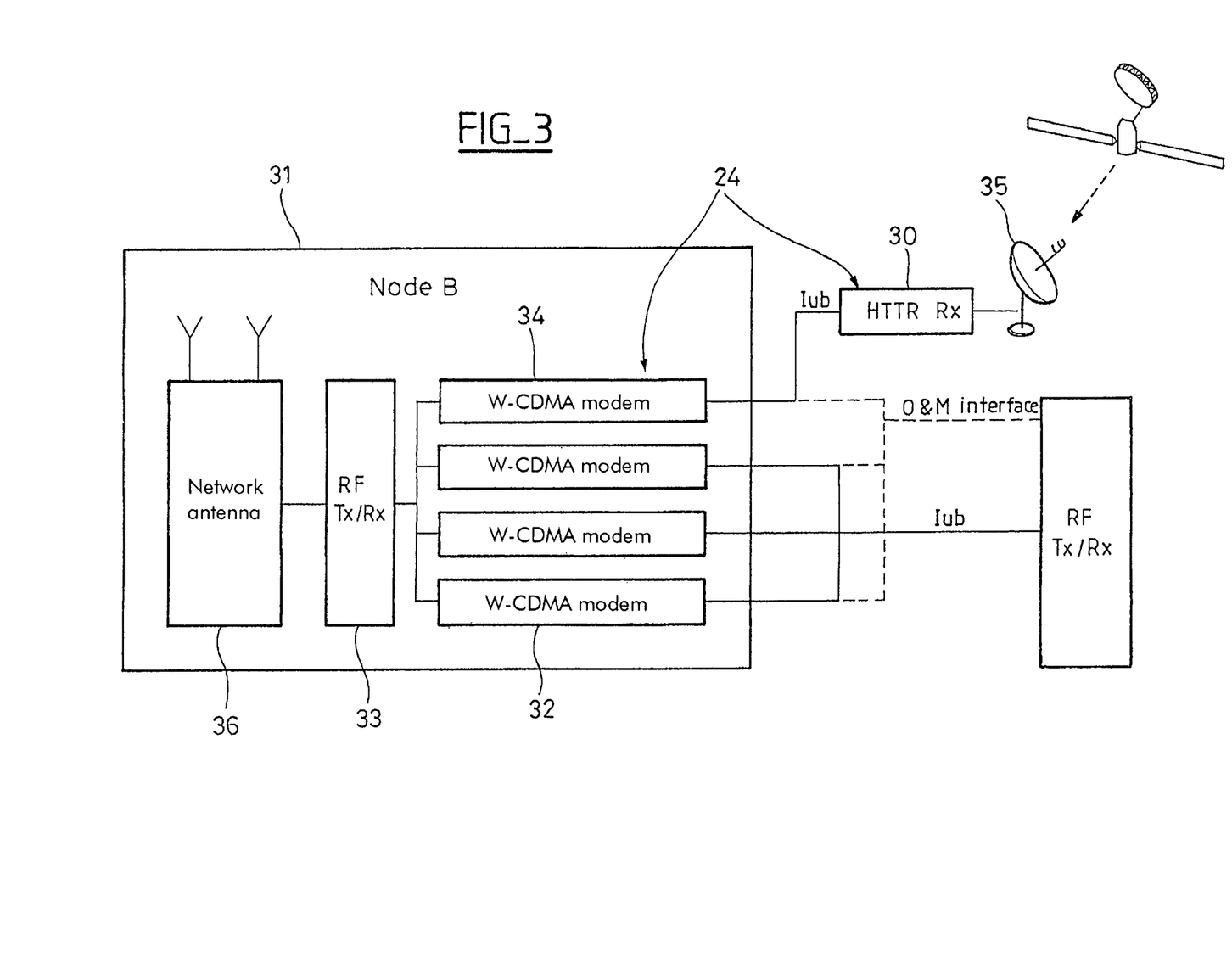
FIG. 3 represents a UMTS base station incorporating a repeater according to the invention.

As shown in FIGS. 2 and 3, to be referred to again later, a UMTS network may be regarded, very schematically but nevertheless sufficiently realistically to assist with understanding the invention, as a core network (CN) coupled to an access network; the access network comprises:

a plurality of radio network controller (RNC) nodes coupled to the core network CN via an Iu interface, and
 a plurality of base transceiver stations, called Nodes B, each associated with one or more cells each covering a radio area and in which one or more user terminals (also known as user equipments UE), such as mobile telephones, may be located and coupled individually or in groups of at least two to one of the RNCs via a logical interface Iub, generally a terrestrial interface. This interface Iub may comprise cable or LDMS (fixed radio) connections, for example, having different types of transmission delay.

These components provide different functions well known to the person skilled in the art using distributed protocol stacks. The terminal of the invention being intended to use the radio resources of at least one Node B, only the protocols involved in managing the Node B radio resources are summarized hereinafter:

- a radio resource control (RRC) module (or layer) which manages the signaling connection used in particular when setting up and clearing down a call between the user equipment UE and the Node B; for example, the RRC module inserts information relating to certain radio parameters of the cell into the system blocks of the broadcast control channel (BCCH),
- a radio link control (RLC) module (or layer) which manages the transport of data between two network equipments, and in particular segments system information blocks into transport blocks,
- a medium access control (MAC) module (or layer) which handles the function of multiplexing data on the various transport channels managed by the Nodes B, in other words the scheduling of the various channels, including the BCCH,
- a Packet Data Convergence Protocol (PDCP) module (or layer) which manages the independence of the UTRAN radio protocols, in particular the RLC and MAC layers, relative to the network data transport protocols and handles compression of data or data packet headers,
- a broadcast/multicast control (BMC) module (or layer) which manages the broadcasting of any type of data, including multimedia data, at the air interface,
- a physical (PHY) module (or layer), also called a modem, which constitutes the physical layer of the air interface and handles the coding, interleaving and modulation functions,
- a frame protocol (FP) module (or layer) which in particular manages the transport of transport blocks over the interface Iub, the transport of RNC power control information to the Node B, support for transport channel synchronization mechanisms, support for Node B synchronization mechanisms, and transfer of radio interface parameters from the RNC to the Node B, and
- a Node B Application Part (NBAP) module (or layer) which in particular manages configuration of the cells controlled by the Node B, the common transport channels, "resource" events enabling the Node B to inform the RNC of the status of its radio resources, and the alignment of the configuration that enables the RNC and the Node B to verify that they have the same radio resource configuration information, and where applicable to coordinate that information.

The configuration and clock parameters of the PDCP/BMC, RRC, RLC and MAC layers associated with the various carriers to which the terminal is synchronized (meaning at least the cellular network paging carrier and the broadcast carrier) are distributed in the user equipments UE and in the RNCs (see FIG. 5). The PHY layer is distributed in the user equipments UE and in the nodes B. The FP and NBAP layers are distributed in the Nodes B and the RNCs, which further comprise a layer L1 that links the Node B to the RNC (using cable or radio (LDMS) link(s), for example).

Consequently, the parameters of the PDCP/BMC, RRC, RLC, MAC and PHY layers used by the UMTS network and the multimedia content broadcasting network are distributed in a memory system 19 of the terminal providing the clocks and the configuration of each of the carriers of the UMTS network and of the system for broadcasting multimedia contents to the terminal UE.

3. Transmission Error Corrector Coding Technique

The present embodiment of the present invention proposes to implement the terminal of the invention in such a manner that it is capable of receiving the digital signal broadcast continuously on the multimedia content carrier and the periodic calling signal from the GSM or UMTS voice carrier simultaneously and with no loss of reception quality in the case of the former signal.

To this end, it is proposed to introduce error corrector coding into the digital signal broadcast continuously whose redundancy rate is minimal, namely 1 for 1 redundancy (one redundant symbol per missing symbol), subject to a transmission delay of the same order as the period of the call signal.

The system of the invention comprises a multicast layer dedicated to broadcasting multimedia content known as the Multimedia Broadcast Multicast Service (MBMS) for the 3G mobile network. It is based on a combined architecture comprising a geostationary satellite segment and terrestrial repeaters in urban and suburban areas with a high blocking rate.

Efficient and robust mechanisms are installed in the transport layer of the broadcasting system of the invention to correct transmission errors such as:
- fast fading,
- temporary blocking when the terminal is no longer in direct view of the satellite and outside the coverage of the terrestrial repeaters, and
- interruptions of about and at most 48 ms in each period of 480 ms for receiving paging messages routed via the 2G network, as described in patent 104392.

The latter point, namely the series of interruptions associated with listening for call signals (paging messages) on the 2G network, is the source of the most severe errors as it creates a binary error rate (BER) after decoding the UMTS physical layer of less than approximately 10%.

This error rate is to be compared to the BER of approximately 1% produced by all other disturbances.

How the terminal processes reception of the UMTS waveform is not modified to re-use the same (UMTS) specifications for the low layers of the terminal. The receiver will eventually desynchronize when it no longer receives the broadcast carrier, after switching to the carrier of the (UMTS or GSM) cellular network.

It is therefore in the highest layers that it is proposed to specify the error corrector coding capable of stopping interruptions in the broadcast message by adding redundancy symbols equally distributed over the user digital signal.

Prior Art:

The local redundancy rate necessary for recovering missing information varies periodically; its average value is relatively high since on average it must stop more than 10% of incorrect symbols in the message.

Convolutional codes are not the optimum for hard decoding, as assumed here, since we are in the application layer, i.e. external to the WaveForm receiver. Moreover, they are not inherently designed for periodic structures, and have short constrained lengths.

Block codes are periodic by definition and have parameterable frame lengths.

The block codes used in detector and corrector codes on Gaussian white noise channels demand at least 2 for 1 redundancy (two redundant symbols per corrected symbol).

The optimum codes on channels with grouped errors are Reed-Solomon codes that may be specified on non-binary symbols. They necessitate only 2 for 1 redundancy.

It must be remembered that a Reed-Solomon code comprising n transmitted symbols of q bits for k payload symbols offers a distance between words of d=n−k+1 symbols. This distance may be exploited to correct any combination of t symbol errors placed at random in the message, provided that 2t≤n−k, i.e. at least two redundant symbols are required to correct one erroneous symbol whose position in the code is not known.

However, because of the high BER (10%), in addition to the energy penalty on the signal to noise ratio of the order of one decibel (0.8 dB), the complexity of error detection-decoding in the decoder increases with the number t of errors to be detected and corrected.

Invention:

According to the invention, the Reed-Solomon coding structure is still used at the application level.

Additionally, the invention teaches using the erased symbol position information from the demodulator common to the two carriers and to communicate it to the Reed-Solomon decoder.

This avoids the RS decoder losing some of its decoding power for detecting the position of the erroneous symbols (in fact half that power).

Accordingly, for the same Reed-Solomon code comprising n transmitted symbols per k payload symbols, i.e. offering the same distance between words of d=n−k+1 symbols, the general formula indicates that any combination of t erroneous symbols and e deleted symbols may be corrected provided that 2t+e≤n−k.

All of the decoding capacity may be embodied in the deleted symbols parameter e.

With t≈0, only one redundant symbol is required to correct one deleted symbol.

Thus the minimum theoretical redundancy is proposed with a view to achieving a practical and accessible implementation.

Knowledge of the Deleted Area:

The data region deleted while listening for call signals is accessible from the switching times of the GSM/GPRS carrier and the resulting interruption of listening to the W-CDMA UTRA FDD multimedia content carrier.

These times may be dated relative to the time structure used for decoding multimedia content data received on the dedicated carrier.

The terminal deduces the deleted multimedia content data and may effect the correction using the redundant information provided.

For the method to work, it must be certain to bracket the area actually deleted. The interruptions of 48 ms referred to hereinabove take account of the increase factor caused by the receiver synchronization time after switching back from paging and the uncertainty as to the time of switching.

Use of the Standard Size RS Structure; Introduction of Interleaving:

RS codes of standard size (i.e. relatively small) may be used and interleaved without significantly increasing the redundancy rate referred to hereinabove for the individual RS codes.

For randomly dispersed erroneous symbols, specifying short interleaved RS codes has the drawback of increasing the individual redundancy of each of the RS codes since, for a given blocking rate, the RS code that encounters the greatest number of symbol errors must be capable of recovering the original information.

In the present situation, the position of the deletions is known and the deletions will be grouped. In order for the deletions themselves to appear equally distributed after de-interleaving and before RS decoding it suffices to disperse the encoded symbols in an equally distributed manner by means of an interleaver after the RS encoders. It is therefore not necessary to increase the redundancy rate of the individual RS codes relative to that which would have been specified for a single long RS code.

It is to be noted, however, that an RS code synchronization word has to be provided. It must also be equally distributed.

The standard size envisaged in the present embodiment is as follows: symbols of 8 bits, n=255 encoded symbols, k=231 payload symbols.

Number of RS codes envisaged: approximately 100.

Using Interleavers to Minimize Transmission Delay, Preferably Convolutional Interleavers:

There are two types of prior art interleaver, namely block interleavers that presuppose storage of data in blocks before dispersion thereof and which are freely parameterable, and convolutional, on the fly interleavers whose structures seek to minimize the interleaving delay and the memory used, which is to the detriment of freedom of parametering.

The features of each type of interleaver are summarized below:

Block interleaving: the data to be transmitted is stored in a rectangular table with two dimensions $(n_1, n_2)$ accessed in write mode by rows, for example, on the upstream side (baseband) and accessed in read mode by columns on the downstream side (toward the IF modulator). The operation of block de-interleaving in the receiver is symmetrical to the rectangular table $(n_2, n_1)$. The values of $n_1$ and $n_2$ are chosen independently; the time taken by this operation is equal to the sum of the storage times in the sender and the receiver, i.e. $2 n_1 n_2$.

Convolutional interleaving: this form of interleaving is intended to minimize the data transmission delay. Instead of storing the data in rectangular tables, it is stored in triangular tables, from shift registers whose number and position in the interleaver and the de-interleaver are asymmetrical. The time taken by a convolutional interleaver/de-interleaver is half that taken by a block interleaver, of the order of $(n_2-1)(n_1+1)$.

It will be noted that the formulation of the decoding power of the RS code used in deletion and the principle of convolutional interleaving is explained on page 774 of the paper by Formey "BURST-CORRECTING CODES FOR THE CLASSIC BURSTY CHANNEL" which appeared in "IEEE Transactions on Communications Technology" Vol. Com-19, N° 5, October 1971. However, this formulation, originally designed for military use to combat intentional propagation fading created by hostiles, has never been used in the civil domain with known switching times. In the prior art, it is the receiver that creates the losses intentionally, not the propagation; the solution according to the invention clearly demonstrates its inventive nature by virtue of this new use, in a domain (civil) that does not correspond to the complex technology of convolutional interleaving, demonstrating that this new use has had to overcome the prejudice of the person skilled in the art.

In conclusion, note that the advantage of the present coding solution is that it does not impact on the physical layer of the terminal, whilst being the optimum from the energy point of view.

Software (and where applicable hardware) modifications are required only in the receiver terminal (higher layer), which is easier.

4. Architecture of the Multimedia Content Broadcasting Network

FIGS. 2 and 3 are described in more detail next.

FIG. 2 shows a GMS/GPRS/UMTS network to which a multimedia content broadcasting network is connected.

The broadcast network comprises a broadcast multicast service center BM-SC and a satellite access network 21.

The satellite access network 21 comprises a multimedia content satellite concentrator 22, known as a "hub", of the multimedia content transmission satellite 18, and a terrestrial repeater 24 for multimedia content sent to the terminals 20.

The embodiment shown in FIG. 2 is more particularly dedicated to what the person known in the art refers to as satellite backhauling. This is transferring, via a satellite link, all the multimedia content traffic that could, in a different embodiment of the invention, not shown, circulate via a terrestrial link between the terminals 20 (user equipments UE) and the core network CN, via a Node B and an RNC.

Here the satellite access network 21 is used. The concentrator 22 is connected to the BM-SC via an interface Gmb or Gi. The BM-SC equipments and the interfaces Gmb and Gi were introduced into the Multimedia Broadcast Multicast Service (MBMS) architecture and are currently being standardized in version 6 of the 3GPP standards "3GPP TS 22.146, Multimedia Broadcast/Multicast Service stage 1" and "3GPP TR 23.846, Multimedia Broadcast/Multicast Service Architecture and Functional". It will be noted that the other functional blocks in FIG. 21 well known to the person skilled in the art as part of the 3GPP network are not described for reasons of clarity. Only the essential elements of the invention are described.

BM-SC

The BM-SC handles the provision of the multimedia content broadcasting service. It may serve as an access point for MBMS transmissions of the content providers 25, 25', initiating the carriers transporting the MBMS data in the PLMN and programming and conveying the MBMS transmissions.

The BM-SC collects contents coming from the various content providers (it will be noted that these may be part of the 3GPP network, such as the provider 25, or a public data network connected to the 3GPP network, such as the Internet, like the provider 25'). Once grouped, the various contents are encoded, indexed and provided with author's and publication right codes. The BM-SC then programs and multiplexes these contents onto the appropriate transmission carriers.

The BM-SC has dedicated functions for ensuring full use of the radio resources assigned to it. Those functions comprise:
  declaration of coverage capacities offered by the broadcasting system,
  routing techniques based on quality of service (QoS) for selecting the transmission carriers over the coverage of the multimedia system or the PLMN, taking account of quality of service constraints and target audiences associated with the broadcasting of the contents, and
  programming techniques taking account of media resource constraints.

Satellite Concentrator

The satellite concentrator 21 handles the modulation of the multimedia content transmission carriers onto a W-CMDA UTRA FDD waveform signal. It forwards this signal to the satellite in a Fixed Satellite System (FSS) frequency band.

The concentrator comprises an SDMB-SN multimedia gateway 26 receiving the data from the BM-SC connected via an Iu interface to a 3GPP RNC 27 in turn connected via an Iub interface to a WCDMA modem 29 and to a Hub to Terrestrial Repeater transmitter HTTR Tx 28.

The function of the multimedia gateway 26 is to interconnect the BM-SC and the standard RNC of the concentrator. This gateway may be constructed from GGSN and SGSN of the 3G core network or from dedicated equipment.

The RNC controls a plurality of WCDMA modems each adapted to generate a WCDMA signal to be retransmitted on a zonal beam of the satellite.

The RNC also controls the WCDMA modems of terrestrial repeaters installed in the 3G base stations or Nodes B. The RNC is connected to the WCDMA modem of each of the terrestrial repeaters via the HTTR Tx module and its corresponding Hub to Terrestrial Repeater Receiver HTTR Rx 30. FIG. 2 shows only the terrestrial repeater 24. To assist understanding, FIG. 3 shows the 3G Node B or base station incorporating the W-CDMA modem of the terrestrial repeater 24 connected to the HTTR Rx module of the terrestrial receiver.

The HTTR Tx module converts the bidirectional Iub interface standardized by the 3GPP to a unidirectional interface. With the HTTR Rx module, it implements the highly efficient transport protocols to set up error free transmission. It uses a modem for sending a carrier using geostationary satellite telecommunication system technologies and operating in the Fixed Satellite Service (FSS) bands, for example. The unidirectional Iub information is modulated onto this carrier.

An RF antenna stage amplifies and converts to the Fixed Satellite Service. (FSS) band the WCDMA signals generated by the modem 29 and the signals generated by the module 28 for transmission to the satellite.

The satellite 18 receives the WCDMA signals from the modem 29, amplifies them and converts them to the IMT 2000 band allocated to the MSS system. It receives the signal generated by the module 28, amplifies it, and converts its frequency to that of another FSS carrier. These two signals are broadcast over the same wide geographical area.

Terrestrial Repeater Network

The terrestrial repeater network is based on a plurality of terrestrial repeaters installed in the base stations 31 of the 3G network as shown in FIG. 3. This eliminates the need for new sites. It will nevertheless be noted that the architecture caters for the deployment of "on channel" terrestrial repeaters that re-amplify the W-CDMA signal received from the satellite to provide coverage of specific closed areas such as tunnels, underground areas, etc.

It must be borne in mind that a 3G base station is a UMTS base station (Node B) or a GSM base station (BTS) and includes a set of WCDMA UTRA FDD modems 32 (the UTRA TDD technology is not considered in the context of the invention). Each modem 32 is able to transmit and receive a W-CDMA signal modulated onto a terrestrial UMTS carrier (in the IMT 2000 frequency bands reserved for transmission at high bit rates assigned to third generation terrestrial mobile systems). Despite a detailed implementation that differs from one base station manufacturer to another, the modems 32 are connected to a radio frequency transmit/receive part (RF Tx/Rx) 33 which amplifies and filters the signals transmitted/received over the air interface by an array of antennas 36.

The WCDMA modem connects the RNC via an interface that supports the 3GPP standard Iub protocol and an O&M protocol, usually a proprietary protocol. The O&M protocol is used to configure and control the modem of the Node B.

The terrestrial repeaters 24 are based on a standard W-CDMA modem 34 and the HTTR Rx module 30 associated with an antenna 35 of a receive ground station.

The HTTR Rx module 30 receives the signals transmitted by the HTTR Tx module 28. The satellite link between the satellite 18, the modules HTTR Tx and HTTR Rx and the SDMB-SN constitutes an $\text{Iub}_{Satellite}$ interface. The modem 34 modulates the information received by the HTTR Rx module onto a WCDMA UTR FDD downlink carrier in the IMT 2000 frequency band allocated to the mobile satellite system.

The module 30 is connected to the modem 34 via an Iub interface. Also, from the point of view of the modem 34, it serves as an RNC proxy.

The HTTR Rx module 30 extracts the information transmitted by the HTTR Rx module 28 and forwards it to the modem 34 so that it may be modulated onto the WCDMA signal addressed to the terminal 20.

Operation and maintenance of the repeater 24 are the responsibility of the base station controller RNC.

Furthermore, to ensure coherent recombination, the system must ensure that the WCDMA satellite signals 20 reaching the terminal 20 directly and the signals reaching the terminal via the repeaters are received by the terminal within its rake receiver window.

This is made possible if the propagation delay of the signals coming from the repeaters is known and constant and if the delay difference between the two paths is less than the size of the rake receiver window of the terminal. The RNC of the satellite concentrator must then delay the direct satellite/terminal path signal in accordance with the delay announced for the indirect signal via the terrestrial repeaters.

To this end, the equipments of the concentrator must be clocked by a highly stable clock supplied by a receiver of a global navigation satellite system known in the art. Furthermore, each HTTR Rx module must be clocked by a high stability clock supplied by a receiver of the same global navigation satellite system.

The system uses the synchronization procedures of the UMTS to maintain the transit delay through all of the terrestrial repeaters fixed and identical.

Thus the invention has been described in an application involving the third generation (3G) cellular network, referring to the UMTS, but subject to the necessary adaptations, it applies to other types of network, for example CDMA 2000 networks.

The invention claimed is:

1. A mobile radio terminal comprising:
   first means (A) for transmitting/receiving radio frequency signals adapted to transmit/receive on paired data/voice carriers to communicate in a cellular mobile radio network, said first means being in a standby mode when no call is set up via the cellular network with another terminal or with the network itself, and
   second means (B) for receiving at least one downlink carrier dedicated to the broadcasting of multimedia content collective information, said second means being activated when the first means are in the standby mode, wherein a portion of circuitry of the first transmit/receive means is common to a portion of circuitry of the second receive means, wherein priority is assigned to calls in the cellular network and the switching means are adapted to switch the first transmit/receive means to an active state when a call arises in said network, and wherein the switch to an active state occurs regardless of whether multimedia content collective information is being received.

2. A terminal according to claim 1, wherein the second means (B) for receiving radio frequency signals are adapted to receive a W-CDMA UTRA FDD downlink carrier that is not paired to a W-CDMA UTRA FDD uplink carrier.

3. A terminal according to claim 1, wherein the second receiving means (B) are coupled to second transmission means adapted to transmit/receive alternately at least one paired uplink and downlink W-CDMA UTRA FDD carrier, said second transmit/receive means having the role of said first transmit/receive means, which is that of transmitting/receiving data/voice.

4. A terminal according to claim 1, wherein the parameters, including the clocks, the PDCP/BMC, RRC, RLC, MAC and PHY layers used by the cellular voice communication network (GSM, UMTS) and the system for broadcasting multimedia contents are divided in a memory system (19) of the terminal, thus providing the clocks and the configurations associated with each of the carriers of said cellular network (GSM, UMTS) and the system for broadcasting multimedia contents to the terminal.

5. A terminal according to claim 1, wherein it comprises switching means (7) for activating second means for receiving the multimedia content information carrier after the first transmit/receive means are placed on standby.

6. A terminal according to claim 1, wherein control means (4) of the terminal are adapted to control at regular time intervals the content of messages transmitted by said cellular network and said switching means are adapted to activate the first transmit/receive means and the second transmit/receive means, respectively, as a function of instructions (Sc) from the control means.

7. A terminal according to claim 1, wherein it comprises storage means (17) for storing the stream of collective information of received multimedia contents.

8. A terminal according to claim 1, wherein the first transmit/receive means are adapted to operate in frequency bands reserved for the GSM and/or UMTS system and the second receive means are adapted to operate in frequency bands reserved for IMT 2000 high bit rate transmissions.

9. A terminal according to claim 1, wherein the carrier dedicated to multimedia content collective information is transmitted by a satellite (18) of a collective information transmission system comprising at least one satellite segment and terrestrial repeaters (24) and in that the frequency bands used are preferably the IMT 2000 bands reserved for satellite mobile systems.

10. A terminal according to claim 1, wherein the carrier dedicated to collective information is transmitted by a terrestrial repeater (24) of a collective information broadcasting system and in that the frequency bands used are the IMT 2000 bands.

11. A method of broadcasting multimedia content collective information by a collective information transmission system, comprising a step of wide broadcasting transmission to a plurality of terminals (20) according to claim 1, wherein said method reiterates the transmission of the collective information in data packets with coding redundancy enabling the required monitoring by the terminal of messages on the cellular network.

12. A method of receiving collective information by a mobile radio terminal (20) comprising first radio frequency signal transmit/receive means for communicating in a cellular mobile radio network, said first means being in a standby mode when no call is set up via the cellular network with another terminal or with the network itself, wherein said method comprises:
   a step of detecting the standby mode of the first transmit/receive means, and
   a step of activating reception of a carrier dedicated to multimedia content collective information when the standby mode is detected, wherein priority is assigned to calls in the cellular network, the first transmit/receive means is switched to an active state when a call arises in said cellular network, and the switch to an active state occurs regardless of whether multimedia content collective information is being received.

13. A system for broadcasting multimedia content to at least one terminal (20), wherein it comprises:
- a service center (BM-SC) for grouping and multiplexing multimedia contents received from a plurality of sources (25, 25'),
- a multimedia content concentrator (21) adapted to receive information transmitted by said service center and comprising transmit means (HTTR Tx 28) for transmitting a multimedia content carrier, and
- a retransmission satellite adapted to receive the latter carrier to convert it to a second carrier in the direction of at least one terrestrial repeater (24),
- said terrestrial repeater comprising means (30) for receiving said second multimedia content carrier and means (34) for extracting said multimedia content information from said second carrier to forward it on a third carrier adapted to be received by the terminal, wherein a second means is provided for transmitting said multimedia content information on a fourth carrier to the satellite adapted to convert from the fourth carrier to the third carrier, which the terminal is adapted to receive directly.

14. A system according to claim 13, wherein the multimedia content information forwarded on said third carrier transmitted by the satellite and by the terrestrial repeaters are received by the terminal in a time window enabling their coherent combination.

15. A terminal according to claim 1, wherein the downlink carrier dedicated to the broadcasting of multimedia content collective information does not carry voice traffic signals.

16. A terminal according to claim 1, wherein in standby mode the terminal is not synchronized with the cellular mobile radio network.

* * * * *